United States Patent [19]

Lazaridis et al.

[11] 3,985,120

[45] Oct. 12, 1976

[54] DEEP FAT FRYER

[75] Inventors: Lazaros J. Lazaridis, Lincoln; Edward F. Searight, Harvard, both of Mass.; Paul K. Shefsiek, Farmington, Mich.

[73] Assignee: Thermo Electron Corporation, Waltham, Mass.

[22] Filed: Jan. 16, 1975

[21] Appl. No.: 541,482

[52] U.S. Cl. .............................. 126/378; 126/387; 99/408

[51] Int. Cl.² .............................. A47J 27/17

[58] Field of Search .............................. 126/387, 376, 378; 99/330, 403–415

[56] References Cited

UNITED STATES PATENTS

| | | | |
|---|---|---|---|
| 477,261 | 6/1892 | Miller | 126/376 |
| 1,907,265 | 5/1933 | Schwedersky | 126/387 |
| 2,326,162 | 8/1943 | O'Connor et al. | 126/378 |
| 2,595,527 | 5/1952 | Kells et al. | 126/376 |
| 2,652,767 | 9/1953 | Childs | 126/387 |
| 3,332,338 | 7/1967 | Wein | 99/403 |

FOREIGN PATENTS OR APPLICATIONS

| | | | |
|---|---|---|---|
| 465,781 | 6/1950 | Canada | 126/378 |
| 1,309,415 | 10/1961 | France | 126/378 |
| 1,315,125 | 12/1961 | France | 99/413 |

*Primary Examiner*—Kenneth W. Sprague
*Assistant Examiner*—Larry I. Schwartz
*Attorney, Agent, or Firm*—James L. Neal

[57] ABSTRACT

A food cooker is illustrated in the form of a deep-fat fryer, in which the fat is isothermally heated to an operating temperature below a temperature range in which an unacceptably high rate of undesirable decomposition products formation occurs in the cooking liquid. The heat transfer process used in vaporization and condensation of a confined liquid essentially isothermally and substantially at the working temperature. Condensation of the heat transfer vapor takes place at an outer surface of the container for the fat. Heat is applied to the heat transfer liquid remote from the container, which having no heating element or elements intruding into its interior is easy to clean. Heat is transferred to the cooking fat by condensation of the heat transfer vapor essentially only as it is used by the load being cooked. Hot spots are minimized, so that the formation of undesirable decomposition products of the cooking fat is retarded. The volume of cooking fat required to cook a given load can be reduced, and its useful life extended.

2 Claims, 7 Drawing Figures

17
12
24
21
38
36
34
37
39
30
32
20
10
18
9
40
43
42
41
27
29
22
28b
28c
8
15
16
26
19
14

DEEP FAT FRYER

BACKGROUND OF THE INVENTION

Food preparation apparatus wherein heat is transferred from a heat source to a food preparation surface by a vaporized working fluid is disclosed and claimed in an earlier application for Letters Patent Ser. No. 165,569 of Lazaridis, Searight and Shefsiek, filed July 23, 1971, now abandoned, which is assigned to the same assignee as the present application. As is explained in that earlier application, a heat transfer liquid is confined in a sealed enclosure which extends from the heat source to the food preparation surface. The heat transfer liquid is vaporized at a surface adjacent the heat source and fills the sealed enclosure. It then condenses on a portion of the sealed enclosure adjacent the food preparation surface and releases heat energy. The apparatus used in this form of heat transfer is sometimes called a "heat pipe". Advantages of this mode of food preparation over prior modes involving use of heat sources applied directly to cooking surfaces or to foodstuffs are stated in the earlier application.

Deep fat frying of foodstuffs is done essentially by immersing the foodstuffs in a vat of heated oil. Deep fat frying equipment that is presently available involves the application of a heat source directly to one side of a partition the opposite side of which is in direct contact with the frying oil. For example, many gas-fired fryers have burner tubes running through the oil fat. These tubes ordinarily have a burner at one end and combustion products travel from the burner through the tube so that heat is transferred from the tube to the oil in the vat. The tubes are understandably hotter at the burner end than at the exhaust end. Although this may result in an average temperature which satisfies the requirements for heat transfer from the tube to the oil, it unavoidably creates, at the hot end, a temperature sufficiently high to produce a substantially larger amount of oil breakdown than that which would be associated with a temperature equivalent to the average temperature of the burner tubes. Further, a vat fitted with electric heating coils or elements will heat oil contained in it only in the vicinity close to the heating elements. Such electric elements tend to overheat the cooking oil in this close vicinity. Most efficient use of electric elements occurs when they are immersed in the cooking oil vat where they require significant space and create objectionable cleaning problems. In the absence of either immersed gas tubes or immersion electric heaters, the usual procedure is just to expose a pot or vat to direct flame.

There must be balance, or "trade-off" of two conflicting parameters, one against the other. On the one hand, it is desirable to cook the food at as high a temperature as possible in order to avoid excessive absorption of the oil by the food being cooked; e.g.: in order to have a relatively dry and crisp donut, instead of a soggy, oily or greasy donut. On the other hand, it is advantageous to maintain the cooking oil at as low a temperature as possible in order to minimize the formation of undesirable reaction products in the oil.

Deep fat frying equipment that is currently available does not achieve desired temperature uniformity and control. The formation of undesirable reaction products of frying oil is a problem which exists with currently available apparatus. This problem is exacerbated by the occurence of hot spots, or relatively hot zones, which may be from any one of several sources, not limited to the inherent properties of existing heating methods. One theory concerning the deleterious effects of hot spots in deep fat fryers suggests that particles of food materials and the like may adhere to the heat transfer surface inside the vat, and act there as a thermal insulator so that heat is not transferred from the wall to the oil. In addition, oil held by these particles cannot move away from the "insulated" spots becoming hotter and causing this oil and oil in contact with it to decompose. In the best of prior situations, the mechanical process of such heating is based on localized over-heating of cooking oil which then heats the contents by convection.

Deterioration of cooking oil is temperature dependent. It occurs continuously as a function of temperature, usually an exponential function, the rate at which undesirable reaction products are produced increasing exponentially in relation to temperature rise.

Generally, chemical breakdown of thermally unstable liquid oils is exponential with increasing temperature, and it is predictable that oxidation or other decomposition at localized hot spots will far exceed the decomposition at normal cooking temperatures. If, for example, localized hot spots exceed the average surface temperature by 25° F or more, they will contribute a disproportionally high amount of thermal decomposition.

Replacement of oil that has formed an excess of undesirable reaction products is both time consuming and costly. It necessitates, among other things, that the vat be cleaned, and this task is not easy when the vat includes burner tubes or immersion heaters. It is apparent that these tubes make it difficult to clean the vat around and under them.

BRIEF SUMMARY OF THE INVENTION

Methods and apparatus are herein disclosed for substantially isothermal heating of a vat containing cooking liquid, such as deep fat frying oil. The apparatus uses a mechanism sometimes known as the heat pipe principle to provide the desired temperature uniformity by employing one or more surfaces of the vat itself as the heat pipe condenser. The oil is thereby heated by an essentially isothermal surface, and the formation of hot spots, or relatively hot zones is minimized, and may for all practical purposes be considered to be substantially eliminated. Particles of food materials and the like that adhere to the vat walls will not result in oil breakdown because, as a covered spot on a wall becomes insulating, it accepts less and less vapor condensation from the heat pipe, and it accepts, therefore, less and less heat energy. The temperature cannot rise above the condensation temperature of the isothermal vapor. The fact that heat is not being transferred away from the spot is no longer important because heat transfer to the spot is reduced. Normal cooking oil such as, for example, cottonseed oil, other vegetable oils and animal fats can be used for long periods of time without developing a rancid odor or taste which will occur in conventional direct immersion heating equipment.

With the risks of hot spots out of the way, it is now possible to transfer heat at maximum heat flux from the entire heat transfer surface, namely the walls of the vat, to the cooking oil. This facilitates quick recovery.

The amount of oil which is absorbed by the food in deep fat frying appears to be related inversely to the oil temperature. When prior deep fat frying apparatus is used and cold food is placed in the oil, the temperature of the oil drops and a relatively large amount of oil absorption occurs before cooking temperature is recovered. On the other hand, in the methods and apparatus of the present invention which employs essentially isothermal transfer of heat to the oil at a desired working temperature uniformly over the entire heating surface, rapid heat transfer to the oil is enhanced so that the temperature of the oil does not drop as far as in prior apparatus and recovers more quickly. The result is a reduction in the amount of oil absorbed by the food. Another result is faster cooking of the food. This results not only in better tasting food (e.g.: a relatively dry and crisp donut), but also in reduced oil consumption, since less oil is removed from the vat with the food, and replacement of the oil is required less frequently.

The invention accordingly, envisions a method of heating, with an isothermal surface, a thermally decomposable liquid such as oil for deep fat frying of foodstuffs, comprising the steps of providing a vat for the cooking liquid which vat has a bottom and side walls, placing the cooking liquid in the vat, locating a vaporizable liquid in the absence of vapors which remain in gas phase at the operating temperature in the vicinity of the exterior of the vat, confining the vaporizable liquid so that its vapors will come in contact with said exterior, heating the vaporizable liquid sufficiently to cause vaporization and condensation thereof, such condensation occuring at the exterior of the vat at a temperature in a range sufficiently high to heat the cooking liquid in the vat to an operating temperature but below a temperature range in which an unacceptably high rate of undesirable reaction products formation occurs in the cooking liquid. Preferably, the cooking temperature of a cooking oil when used in the vat is maintained in the range between, approximately 350° F and 400° F.

The heat pipe principle employed in this invention uses a sealed space filled essentially entirely with liquid and gas phases of a vaporizable fluid, to the exclusion of non-condensing gases such as air. At working temperatures there is always a significant vapor pressure, and if liquid is vaporized at one location in the sealed space, it condenses at any cooler location with releases of the energy equivalent of the heat of vaporization. Consequently essentially isothermal conditions are favored and heat supplied to the liquid phase is immediately available at any cool surface. The system used in this invention is intended to operate at a relatively low pressure, usually but not necessarily, less than one atmosphere.

DESCRIPTION OF THE DRAWINGS

Figure 1:
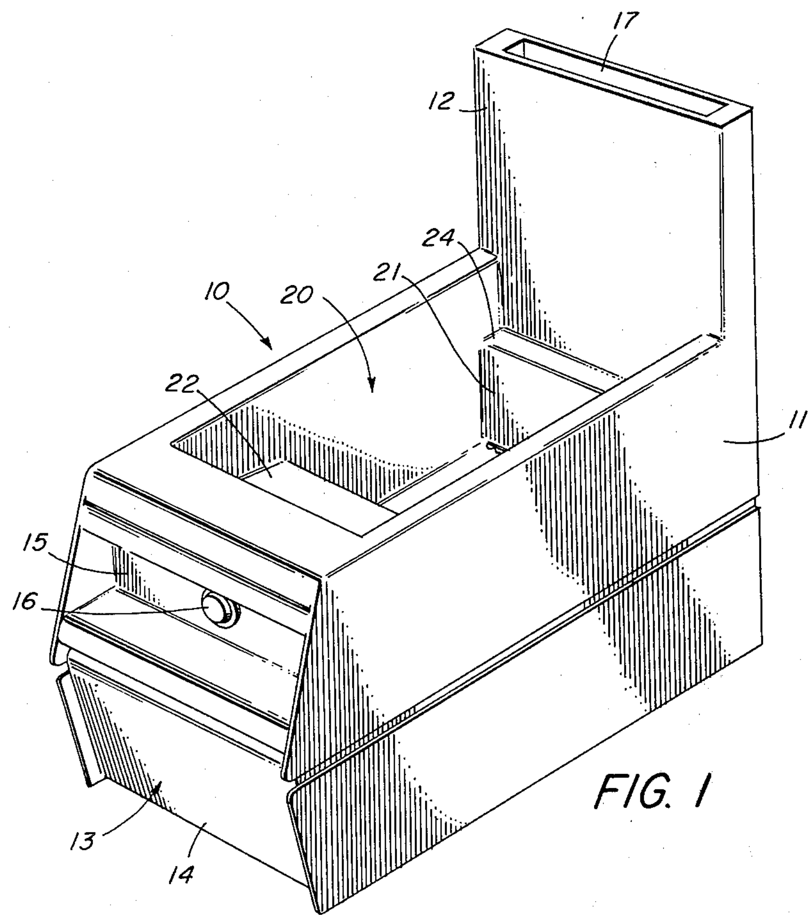
FIG. 1 is a general isometric view of a food cooker according to the invention.

In FIG. 1, is illustrated the food cooker generally designated 10 according to one embodiment of the invention. The cabinet of the food cooker has side walls 11, a back wall 12 and a front panel generally designated 13. A bottom segment 14 of the front wall is removable, permitting access to the internal mechanism. An upper segment 15 of the front panel 13 is positioned to contain control mechanisms such as for example, a temperature control knob 16 associated with thermostatic control 8 and temperature sensor 9. A chimney or exhaust port 17 in the back wall 12 permits exit of burned combustion gases.

The cooking chamber or vat, generally designated 20, is defined by the two side walls 11, a rear panel 21 and a front wall 18 (see FIG. 3) terminating in an upper shelf 22. The cooking vat is adapted and intended to contain a cooking oil or other cooking liquid up to a level generally approximately equal to the shelf 22 and a corresponding upper shelf 24 on back panel 21. Within the cooking vat there are no obstructions or working parts. The cooking vat, accordingly, is essentially a container of desired size and shape for a cooking oil adapted to receive, as is conventional in the art, a food holding wire basket (not shown) or other mechanism for insertion or immersion in cooking oil contained within the vat.

Figure 2:
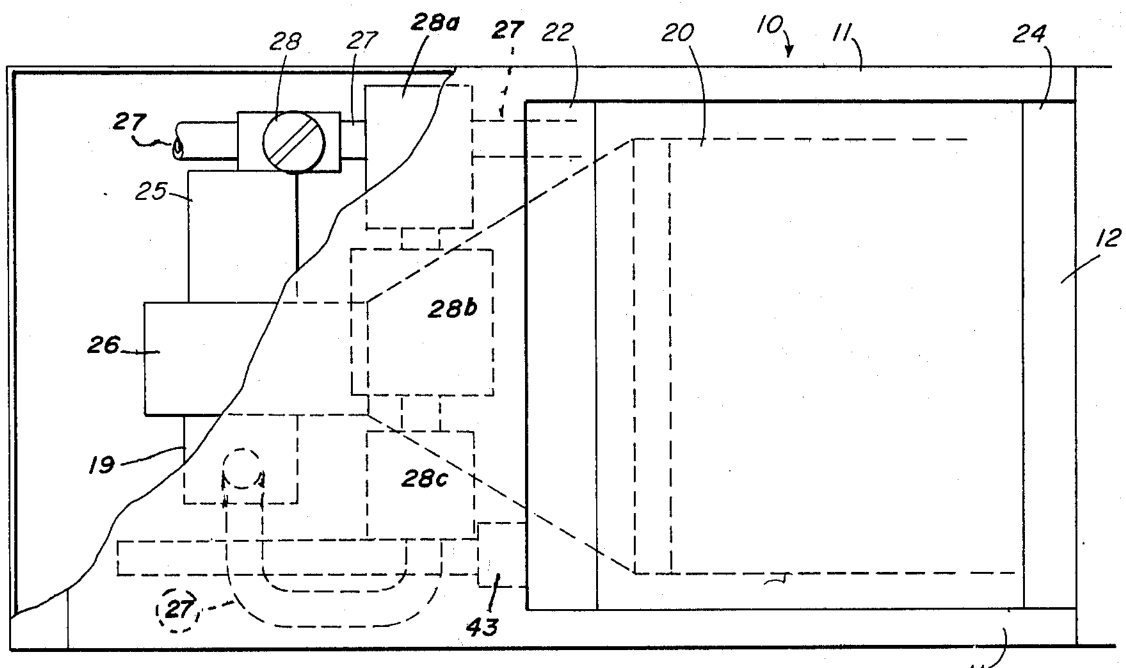
FIG. 2 is a top plan view, partly broken away, of FIG. 1.
Figure 3:
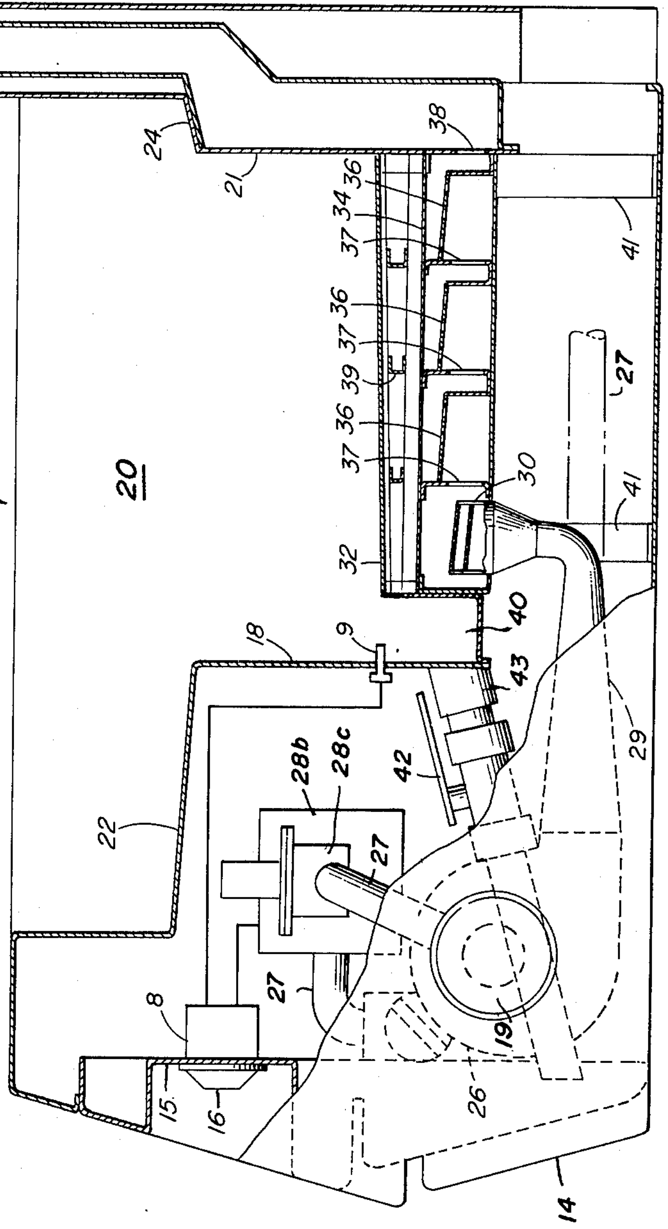
FIG. 3 is a side view, partly broken away, of FIG. 1.

In FIG. 2 and FIG. 3 are shown the deep fat fryer generally designated 10, as in FIG. 1, and illustrating the cooking vat 20, including side walls 11, back wall 12, front wall 18 and front shelf 22 and rear panel 24. Within the cabinet in front of the cooking vat 20 is a motor 25 operating a blower fan 26 adapted to receive combustible gas from a gas pipe 27 feeding through a main shut off valve 28. Suitable gas fuel and air pipes and chambers include an air mix control 19 for mixing gas and air conventionally. A pressure regulator **28*a* operates to provide desired gas pressure to a thermostatically-operated gas valve 28*b*, which may be operated from a safety circuit, and after it, just prior to the air mix control 19, is a zero governor 28*c* providing an output pressure that is equal to ambient, to maintain the air-gas ratio at the burner at a desired essentially constant value. The gas-air mixture from the blower 26 is passed into a fan shaped conduit for distribution across the area of the vat of the food cooker and to a burner 30 mounted at the entrance of conduit 29 to a heating chamber at the bottom of the vat. Also shown is the chimney 17, front panel 15 and temperature control knob 16. This temperature control knob operates a thermostat to open or close a valve 28*b* in response to the temperature of cooking oil in the vat. The heating chamber as hereinafter described is positioned underneath most of the area of the bottom of vat 20. The heating wall 32 may occupy less than all the bottom of the vat, leaving a well 40 at one portion. This provides for collecting in well 40 solid particles which collect in the oil. A drain 43 at the bottom of well 40 is adapted to be opened by valve 42** to empty used cooking oil for cleaning.

Figure 4:
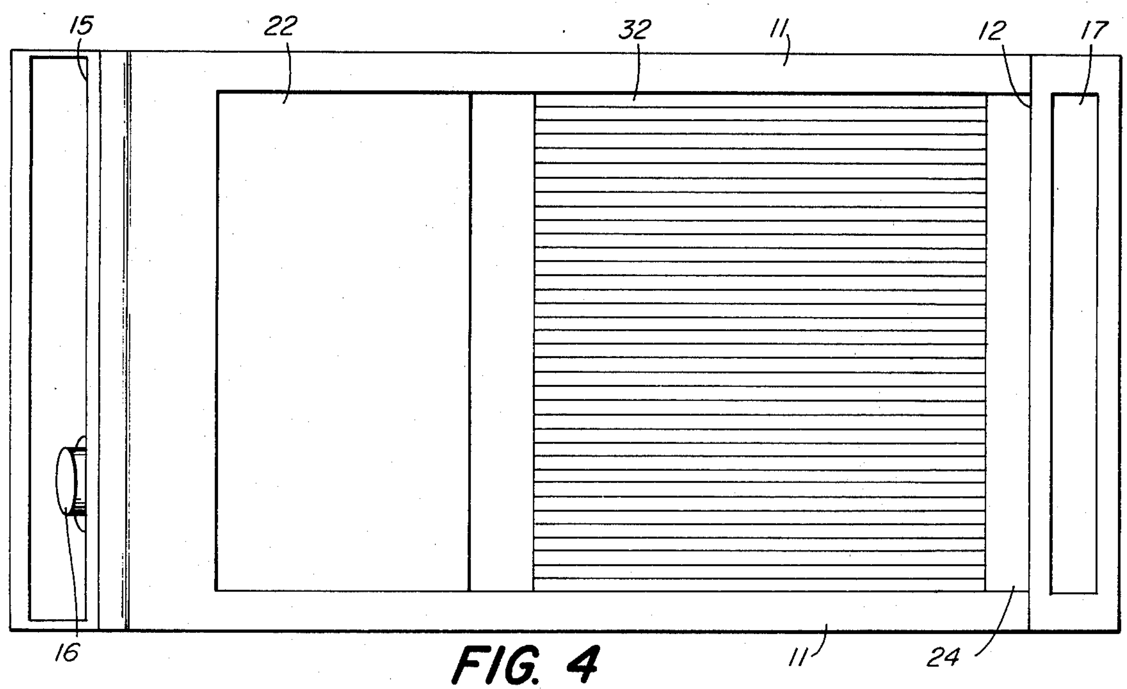
FIG. 4 is a top view of FIG. 1, showing the formation of the bottom wall of the cooker.
Figure 5:
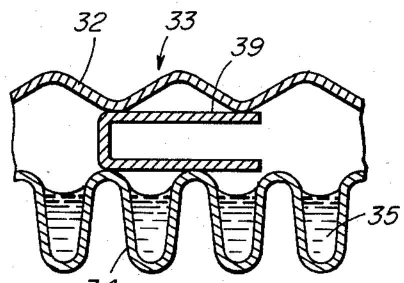
FIG. 5 is a fragmentary enlarged cross-section of a heat-transfer component of FIG. 1.

In FIG. 4, which is a top view of the food cooker illustrated in FIGS. 1, 2 and 3 are shown the side walls 11, back wall 12, chimney 17, shelf 22, front panel 15 and control knob 16 as previously described. In the top view, as shown in FIG. 4, can be seen bottom panel 32 of the cooking vat. Attention is directed to the corrugations in the surface configuration of this bottom panel, as illustrated in larger size in FIG. 5. There shown in FIG. 5, is a double walled bottom panel or heat transfer chamber generally designated 33 to accomplish isothermal heat transfer. The upper surface of this heat transfer chamber 33 is a corrugated panel 32 forming the bottom of the cooking vat. Braces 39 separate and support panels 32 and 34. The lower wall or bottom of the heat transfer chamber 33 is again a corrugated metal sheet. Contained within the heat transfer chamber 33 is a quantity of a liquid 35 which may as desired be sufficient to completely fill the corrugated or roughened contour of sheet panel 34. The edges and corners of the heat transfer chamber 33 are thoroughly and completely sealed and the open space within the heat transfer chamber is substantially completely free of non-condensable gaseous material.

Figure 5A:
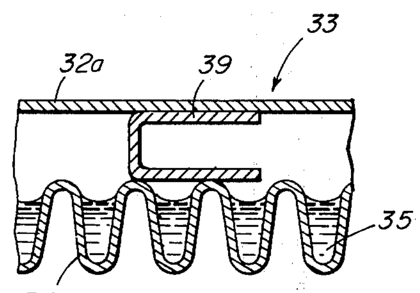
FIG. 5A is a fragmentary enlarged cross section of a heat transfer component according to another embodiment of the invention.
Figure 5B:
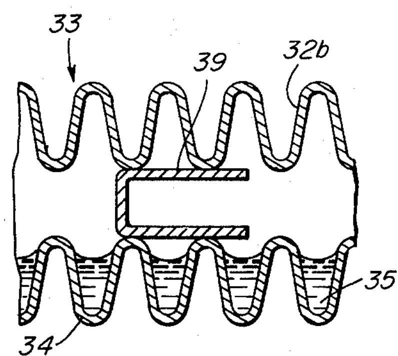
FIG. 5B is a fragmentary enlarged cross section of a heat transfer component according to a further embodiment of the invention.

In FIGS. 5A and 5B are shown other embodiments of the invention. In FIGS. 5A and 5B heat transfer chamber 33 comprises a corrugated bottom wall or sheet panel 34 holding liquid 35. Braces 39 support and separate upper panels; in FIG. 5A, upper panel 32*a* is smooth and flat, and in FIG. 5B, upper panel 32*b* is corrugated. In each of FIG. 5, FIG. 5A and FIG. 5B bottom panel 34 is corrugated to provide extra heat transfer surface to accomplish extremely rapid heat transfer from the heat source to liquid 35.

Referring again to FIG. 3, the bottom 32 of the cooking vat or the heat transfer chamber 33 is positioned directly over burner 30. A heat chamber including verticle baffles 37 and upper baffles 36 extends substantially completely under the bottom of the vat to provide a relatively broad hot air space to permit heating of the heat transfer chamber, the whole being mounted on supports 41. At the rear of this space, an exhaust 38 is positioned to convey burned gas into chimney 17 and thus out of the food cooking device. Support members 39 within the heat transfer chamber serve to maintain the desired sturdiness and separation between the upper wall 32 of the heat transfer chamber which wall forms the bottom of the cooking vat and the lower wall 34 of the heat transfer chamber. Being positioned between the hot air chamber and the vat itself, wall 34 is the "evaporator" or heat input surface of the heat transfer chamber and the upper wall 32 of the heat transfer chamber is the "condenser" or heat output wall of the heat transfer chamber.

In use and operation, the gas pipe 27 is connected to a source of combustible gas and motor 25 is connected to an electrical outlet. The cooking vat 20 is filled with a cooking oil (not shown) to a level slightly below shelves 22 and 24. The blower is turned on, the burner lighted and the liquid 35 in heat transfer chamber 33 virtually immediately is strongly heated. The heat transfer chamber is substantially free from non-condensable material, and accordingly, there is a uniform vapor pressure of liquid 35 in the vapor space. Whenever the condenser 32 of the heat transfer chamber is colder than the evaporator 34 of the heat transfer chamber, this vapor in the vapor space continuously condenses on the condenser, thus releasing its energy or heat and consequently, heating the wall and the cooking oil within the cooking vat. The entire condenser 32 is constantly heated by an extremely rapid flow of heat to and through the wall 32. If for some reason, absorption of heat into the oil is blocked as for example, by food which drops to the bottom of the vat or which is caused to adhere to the bottom of the vat, the result is not localized overheating of wall 32, but instead, isothermal transfer of heat. If the heat is not absorbed at any specific location, the wall inherently remains at the same temperature as the other portions of the wall. Heat ceases to be transferred through the wall at such a localization of heat transfer and instead, the heat is isothermally applied to the other areas of the wall 32. Consequently, heating energy is imparted to the cooking oil at all locations where circulation is free to permit this heat to be spread throughout the volume of the cooking oil. Burning of the food or overheating of the oil cannot occur at any location except if the entire volume of the oil is burned or overheated.

What is claimed is:

1. A deep fat fryer comprising:

a jacketed, relatively deep cooking vat adapted to contain and to heat for immersion cooking an edible, thermally decomposable cooking oil which is rapidly decomposed at temperatures substantially above normal cooking temperatures, the internal portions of said vat being free from obstructions and open at its top;

a heat transfer liquid volatile at normal cooking temperatures sealed within a jacket at least partially surrounding said vat, the interior of said jacket being essentially devoid of substances which are not condensible at operating conditions;

heating means;

means defining a heating zone for the heat transfer liquid said means including a first heat transfer wall and a second heat transfer wall, said first heat transfer wall being adjacent said heating means to conduct heat from said heating means to said heat transfer liquid to vaporize said liquid, said wall being corrugated to increase wall area for heat transfer and to promote rapid heat transfer between said heating means and said heat transfer liquid, said second heat transfer wall being a wall of said cooking vat adapted to be in direct liquid-to-wall contact with said cooking oil to transfer heat rapidly from said wall to said cooking oil, said second heat transfer wall including an oil heating portion of the bottom wall of said vat across less than all of said bottom wall;

means defining a sealed free path between said first heat transfer wall and said second heat transfer wall to permit vaporized heat transfer liquid to pass from said heat transfer wall to said vat;

a recess at the bottom of said vat adjacent said oil heating portion, whereby heating said oil causes convection currents to carry contaminants in said oil to said recess; and means to return condensed heat transfer liquid to said heat transfer wall.

2. A deep fat fryer according to claim 1 wherein said heating means comprises a gas burner and means to direct hot combustion gases to said heat transfer wall.

* * * * *

UNITED STATES PATENT OFFICE
CERTIFICATE OF CORRECTION

Patent No. 3,985,120 Dated October 12, 1976

Inventor(s) Lazaros J. Lazaridis, Edward F. Searight
Paul K. Shefsiek

It is certified that error appears in the above-identified patent and that said Letters Patent are hereby corrected as shown below:

On the title page after "[21] Appl. No.: 541,482", the following should be added:

- - Related U.S. Application Data

[63] Continuation-in-Part of Ser. No. 359,974, filed May 14, 1973, now abandoned. - -

In the specification in column 1 immediately after the title, the following should be added:

--CROSS-REFERENCE TO RELATED APPLICATION

This is a continuation-in-part of U.S. application Serial No. 359,974, filed May 14, 1973, now abandoned.--

Signed and Sealed this

*Twenty-fourth* Day of *October 1978*

[SEAL]

*Attest:*

RUTH C. MASON
*Attesting Officer*

DONALD W. BANNER
*Commissioner of Patents and Trademarks*